(12) United States Patent
Ramos Ibarra

(10) Patent No.: US 10,971,967 B2
(45) Date of Patent: Apr. 6, 2021

(54) ELECTRIC MOTOR FOR AN ELEVATOR SYSTEM AND ELEVATOR SYSTEM COMPRISING SUCH A MOTOR

(71) Applicant: Otis Elevator Company, Farmington, CT (US)

(72) Inventor: Enrique Ramos Ibarra, Madrid (ES)

(73) Assignee: OTIS ELEVATOR COMPANY, Farmington, CT (US)

( * ) Notice: Subject to any disclaimer, the term of this patent is extended or adjusted under 35 U.S.C. 154(b) by 104 days.

(21) Appl. No.: 16/290,180

(22) Filed: Mar. 1, 2019

(65) Prior Publication Data

US 2019/0273413 A1 Sep. 5, 2019

(30) Foreign Application Priority Data

Mar. 1, 2018 (EP) .................................. 18159560

(51) Int. Cl.
| | | |
|---|---|---|
| *H02K 5/22* | (2006.01) | |
| *B66B 11/04* | (2006.01) | |
| *H02K 5/10* | (2006.01) | |
| *H01R 13/73* | (2006.01) | |
| *H02K 7/14* | (2006.01) | |

(52) U.S. Cl.
CPC ............ *H02K 5/225* (2013.01); *B66B 11/043* (2013.01); *H02K 5/10* (2013.01); *H01R 13/73* (2013.01); *H02K 7/14* (2013.01); *H02K 2213/03* (2013.01)

(58) Field of Classification Search
CPC .. H02K 5/04; H02K 5/10; H02K 5/12; H02K 5/136; H02K 5/15; H02K 5/22; H02K 5/225; H02K 7/14; H02K 3/38; H02K 3/50; H01R 13/73; B66B 11/043

USPC .............. 310/71, 88–89, 400, 402, 405–407, 310/410–411

See application file for complete search history.

(56) References Cited

U.S. PATENT DOCUMENTS

| | | | |
|---|---|---|---|
| 2,592,070 A | * | 4/1952 | Robinson ............... H02K 5/225 310/71 |
| 4,464,593 A | | 8/1984 | Kofink |
| 5,113,103 A | * | 5/1992 | Blum ....................... H02K 5/20 310/89 |
| 5,786,647 A | | 7/1998 | Vollmer et al. |
| 6,076,795 A | | 6/2000 | Scheidel et al. |
| 6,088,904 A | | 7/2000 | Keck et al. |
| 6,166,468 A | | 12/2000 | Suzuki et al. |

(Continued)

FOREIGN PATENT DOCUMENTS

| | | |
|---|---|---|
| DE | 102008058926 A1 | 5/2010 |
| DE | 102012218505 A1 | 4/2014 |

(Continued)

OTHER PUBLICATIONS

European Search Report for application EP 18159560.4, dated Jul. 12, 2018, 28 pages.

*Primary Examiner* — Burton S Mullins
(74) *Attorney, Agent, or Firm* — Cantor Colburn LLP

(57) ABSTRACT

An electric motor (20) for an elevator system (2) comprises a housing (25) extending in a longitudinal direction along a longitudinal axis (A) and a cover (22) attached to a front face of the housing (25). The cover (22) comprises an open space (24) formed around the longitudinal axis (A). At least one electric connector (38, 40), which is electrically connectable with component of the electric motor (20), is arranged within said open space (24).

14 Claims, 5 Drawing Sheets

(56) References Cited

U.S. PATENT DOCUMENTS

| | | | |
|---|---|---|---|
| 6,392,323 B1 | 5/2002 | Parker | |
| 6,731,036 B2 | 5/2004 | Ghiotto | |
| 6,750,574 B2 * | 6/2004 | Okazaki | H02K 3/50 |
| | | | 310/68 B |
| 6,897,580 B2 | 5/2005 | White | |
| 7,078,835 B2 | 7/2006 | Gross et al. | |
| 7,681,692 B2 * | 3/2010 | Fischer | B66B 11/043 |
| | | | 187/256 |
| 7,705,496 B2 | 4/2010 | Zisler et al. | |
| 7,728,470 B2 | 6/2010 | Saur et al. | |
| 7,902,705 B2 | 3/2011 | Gravlin et al. | |
| 8,004,135 B2 | 8/2011 | Peterson et al. | |
| 9,093,884 B2 | 7/2015 | Major et al. | |
| 9,391,493 B2 | 7/2016 | Leung et al. | |
| 9,564,784 B2 | 2/2017 | Yokoe et al. | |
| 9,768,658 B2 * | 9/2017 | Bulatow | H02K 5/04 |
| 2007/0159017 A1 * | 7/2007 | Martin | H02K 5/136 |
| | | | 310/88 |
| 2016/0160961 A1 | 6/2016 | Biro et al. | |
| 2018/0159397 A1 * | 6/2018 | Houzumi | H02K 3/50 |

FOREIGN PATENT DOCUMENTS

| | | | |
|---|---|---|---|
| DE | 112015004262 T5 | 6/2017 | |
| EP | 1810389 B1 | 12/2010 | |
| JP | 2003021064 A | 1/2003 | |
| JP | 2013066327 A | 4/2013 | |
| JP | 2013121779 A | 6/2013 | |
| JP | 2017163810 A | 9/2017 | |
| KR | 20110077810 A | 7/2011 | |
| WO | 03001647 A1 | 1/2003 | |
| WO | 2009075671 | * 6/2009 | H02K 7/003 |

* cited by examiner

ELECTRIC MOTOR FOR AN ELEVATOR SYSTEM AND ELEVATOR SYSTEM COMPRISING SUCH A MOTOR

The invention relates to an electric motor for an elevator system and to an elevator system comprising such an electric motor.

Elevator systems comprise a drive including a motor for driving at least one elevator car traveling along a hoistway. The motor usually is an electric motor and comprises electric connectors for electrically connecting the motor with an electric power supply and/or a control unit. The electric connectors are prone to be damaged by mechanical impact. Further, there is some risk that liquids such as water or oil penetrate to the electric connectors causing an electric short circuit and/or spoiling the electric connectors.

It therefore is desirable to protect the electric connectors from adverse environmental influences such as mechanical impacts and/or liquids.

According to an exemplary embodiment of the invention, an electric motor for an elevator system comprises a housing extending in a longitudinal direction along a longitudinal axis, and a cover attached to a front face of the housing. The cover in particular does not cover the perimeter of the housing. An open space, i.e. a hollow space which is open to the environment on at least one side, is formed within the cover, and at least one electric connector, which is electrically connectable to an electric component of the motor, is arranged within said open space. The open space in particular is formed around the longitudinal axis.

Exemplary embodiments of the invention also include an elevator system comprising an electric motor according to an exemplary embodiment of the invention.

As a result of being arranged within the open space formed within the cover, the at least one electric connector is protected from mechanical impact. The cover further protects the at least one connector from liquids, such as water and/or oil, that may flow along the outer periphery of the electric motor, for example due to a leakage in the vicinity of the electric motor, in particular due to a leakage occurring in an area above the electric motor.

A number of optional features are set out in the following. These features may be realized in particular embodiments, alone or in combination with any of the other features.

The open space may comprise an opening facing the electric motor. The opening may be closed by a bottom plate arranged within said opening.

The cover and the bottom plate may be made of metal for shielding electromagnetic emissions which are generated when the electric motor is operated.

The bottom plate and the cover may be made of different materials. For example, the bottom plate may be made of zinc plated steel and the cover may be made of galvanized steel, respectively.

The bottom plate may be fixed to the cover by means of suitable fastening elements, such as rivets or screws.

The at least one electric connector may be L-shaped, in particular comprising a first leg extending parallel to the longitudinal axis, and a second leg extending in a direction which is oriented radially with respect to the longitudinal axis.

The axial orientation of the first leg allows for easily connecting the at least one connector with an external plug. The radial orientation of the second leg allows electrically connecting the connector with components of the electric motor, in particular with at least one electric coil of the electric motor, conveniently, e.g. using electric conductors, such as electric cables or wires.

The cover may comprise at least one flange formed at the open space adjacent to the at least one electric connector. The at least one flange may be configured for blocking liquids flowing along the cover. Such a flange may enhance the protection of the at least one electric connector from liquids flowing along the periphery of the electric motor.

The housing of the electric motor extends along the longitudinal axis with the front face of the housing being oriented basically orthogonally to said longitudinal axis. The front face of the housing may have a circular or rectangular shape, in particular an almost square shape.

The cover may include a ring portion having a basically circular contour in a plane extending basically parallel to the front face of the housing, i.e. orthogonally to the longitudinal axis. The cover in particular may include a ring portion having a doughnut like shape extending circularly around the open space located in the center of the doughnut. A cover comprising such a structure may be mounted easily to the front face of a basically cylindrical housing.

The cover may include at least one flap extending radially from an outer periphery of the cover, in particular from the basically circular outer portion of the cover. The at least one flap may be configured for mounting the cover to the housing. The at least one flap in particular may comprise at least one opening allowing fastening elements to extend through the at least one flap into to the housing of the electric motor for mounting and securely fixing the cover to the housing.

In a plane extending parallel to the front face of the housing, i.e. in a plane extending orthogonally to the longitudinal axis, the open space may have a basically circular contour. The open space in particular may be defined by an inner circular wall extending around the longitudinal axis. A cover having an open space with a basically circular contour may be produced easily and allows mounting the at least one connector at any desired position along the inner wall of the open space.

In a sectional plane extending orthogonally to the front face of the housing, i.e. in a sectional plane comprising the longitudinal axis, the cover may have a basically U-shaped contour with the open space being located between the legs of the "U".

The open space may be formed as a through hole extending through the whole width of the cover. A bottom ring extending over an outer portion of the open space may be provided at one side of the cover, reducing the diameter of the opening at this side of the open space. A bottom plate extending over the whole diameter of the opening is provided within the opening at the side of the open space facing the housing. The bottom ring or bottom plate provides an additional surface facing the housing. The additional surface may be used for fixing the bottom plate to the cover.

The edges of the cover and/or of the open space may be slanted and/or curved in order to avoid sharp edges which could cause injury to a mechanic working close to the electric motor.

In a plane oriented orthogonally to the longitudinal axis, the diameter of the cover may basically correspond to the diameter of the front face of the housing. In such a configuration, the cover almost completely covers the front face of the housing without increasing the space needed for installing the electric motor considerably.

The electric motor may be a synchronous electric motor, in particular an electric motor comprising permanent magnets. A synchronous electric motor is very suitable for being employed in an elevator system.

Alternatively, the motor may by an induction motor or a switched reluctance motor.

In the following exemplary embodiments of the invention are described with reference to the enclosed figures.

FIG. 1 schematically depicts an elevator system comprising a drive with an elevator machine including an electric motor according to an exemplary embodiment of the invention.

Figure 1:
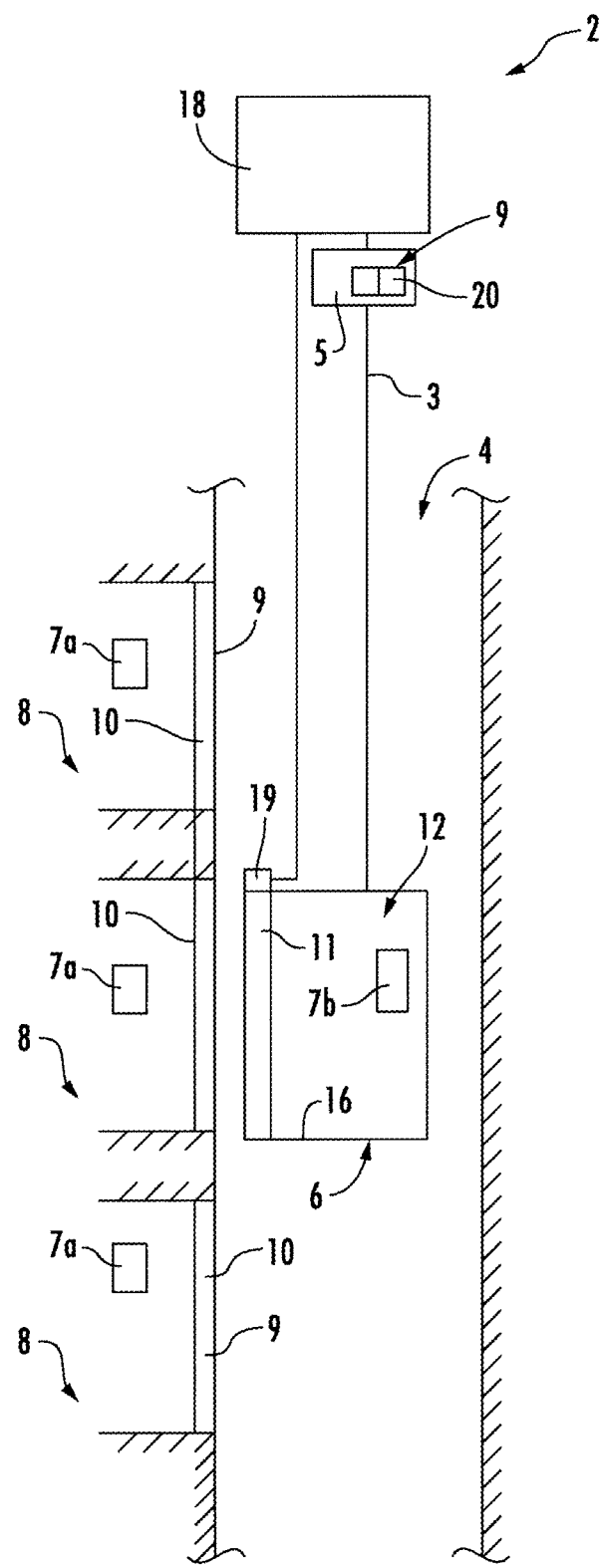

FIG. 1 schematically depicts an elevator system 2 comprising an elevator car 6 according to an exemplary embodiment of the invention.

The elevator system 2 comprises a hoistway 4 extending in a longitudinal direction between a plurality of landings 8 located on different floors.

The elevator car 6 is movably suspended within the hoistway 4 by means of a tension member 3. The tension member 3, for example a rope or belt, is connected to a drive (elevator drive) 5 including an elevator machine 9 with an electric motor 20 according to an exemplary embodiment of the invention. The drive 5 is configured for driving the tension member 3 in order to move the elevator car 6 along the longitudinal direction/height of the hoistway 4 between the plurality of landings 8.

Each landing 8 is provided with a landing door (elevator hoistway door) 10, and the elevator car 6 is provided with a corresponding elevator car door 11 allowing passengers to transfer between a landing 8 and the interior space 12 of the elevator car 6 when the elevator car 6 is positioned at the respective landing 8.

The exemplary embodiment of the elevator system 2 shown in FIG. 1 employs a 1:1 roping for suspending the elevator car 6. The skilled person, however, easily understands that the type of the roping is not essential for the invention and that different kinds of roping, e.g. a 2:1 roping, may be used as well. The elevator system 2 may further include a counterweight (not shown) moving concurrently and in opposite direction with respect to the elevator car 6. Alternatively, the elevator system 2 may be an elevator system 2 without a counterweight, as it is shown in FIG. 1. The elevator system 2 may have a machine room or may be a machine room-less elevator system. The elevator system 2 may use a tension member 3, as it is shown in FIG. 1, or it may be an elevator system without a tension member 3, comprising e.g. a hydraulic drive (not shown) including a hydraulic pump driven by an electric motor 20.

The drive 5 is controlled by an elevator control 18 for moving the elevator car 6 along the hoistway 4 between the different landings 8.

Input to the elevator control 18 may be provided via landing control panels 7a, which are provided on each landing 8 close to the elevator landing doors 10, and/or via a car operation panel 7b provided inside the elevator car 6.

The landing control panels 7a and the car operation panel 7b may be connected to the elevator control 18 by means of electric lines, which are not shown in FIG. 1, in particular by an electric bus, e.g. a field bus such as a CAN bus, or by means of wireless data connections.

In order to determine the current position of the elevator car 6, the elevator car 6 is provided with a position sensor 19. The position sensor 19 may be arranged at the top of the elevator car 6 as shown in FIG. 1. Alternatively, the position sensor 19 may be provided at a side of the elevator car 6 or at the bottom, e.g. below a floor 16, of the elevator car 6.

Figure 2:
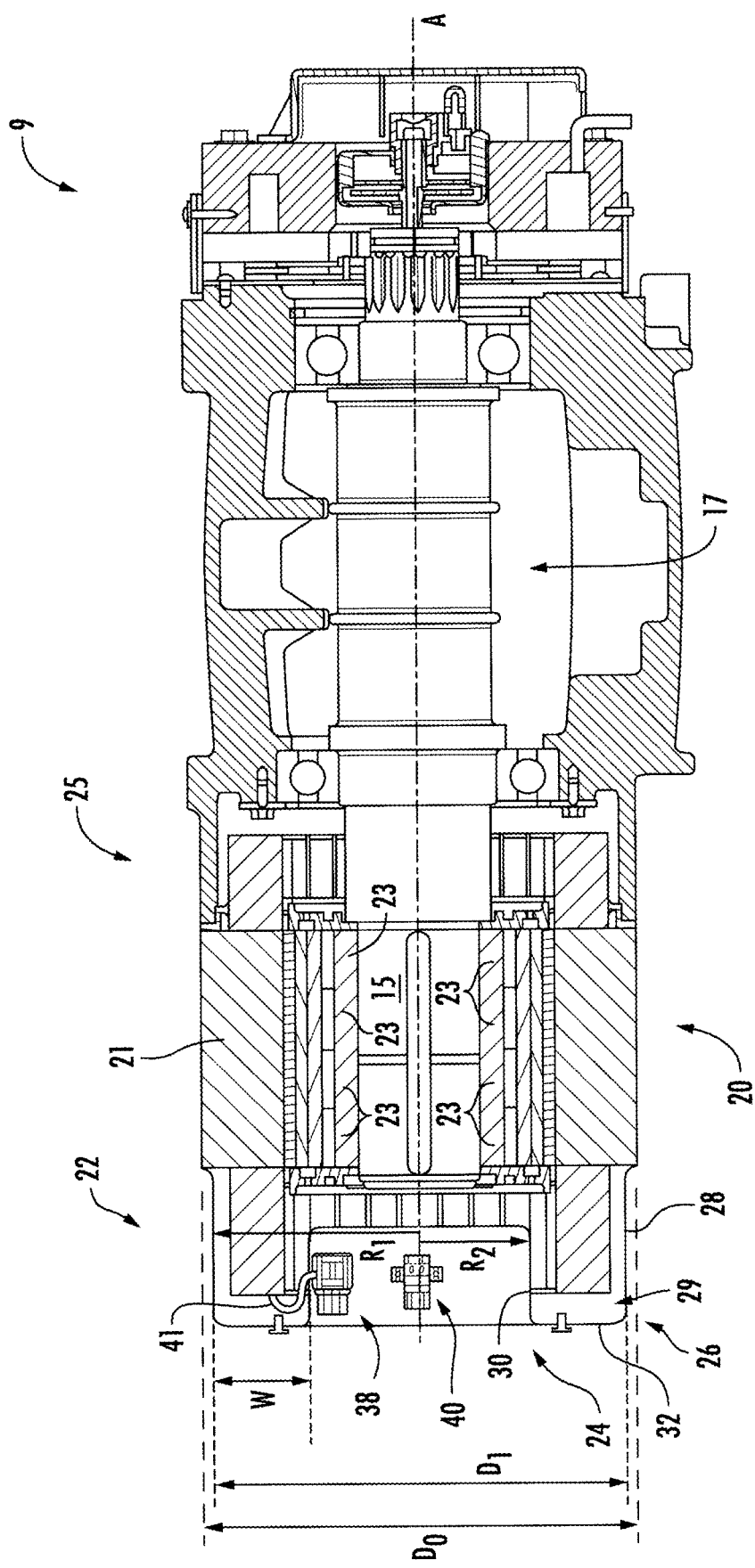
FIG. 2 shows a sectional view extending through the elevator machine of the drive including a cover according to an exemplary embodiment of the invention.

FIG. 2 shows a sectional view through the elevator machine 9 of the drive 5 comprising an electric motor 20, a housing 25, and a cover 22 according to an exemplary embodiment of the invention. The cover 22 is usually made of metal for shielding electromagnetic emissions generated by operating the electric motor 20. The electric motor 20 may be a synchronous electric motor comprising permanent magnets 23 attached to a rotatable shaft 15 and being surrounded by at least one electric coil 21.

The shaft 15 extends along, and is rotatable around, a longitudinal axis A extending in a longitudinal direction through the elevator machine 9. The shaft 15 is coaxially connected with a rotatable roll or drum 17. The tension member 3 (not shown) of the elevator system 2 (cf. FIG. 1) extends along the outer periphery of the roll or drum 17 and is driven by rotating the roll or drum 17.

Further details of the elevator machine 9 are not discussed, as they are not relevant for the present invention.

The front side of the housing 25 facing away from the roll or drum 17 (the left side in FIG. 2) is covered by a cover 22 according to an exemplary embodiment of the invention. The cover 22 in particular does not cover the perimeter of the housing 25.

The diameter $D_1$ of the cover 22 in a plane oriented orthogonally to the longitudinal axis is slightly smaller than the diameter $D_0$ of the electric motor 20.

Figure 4:
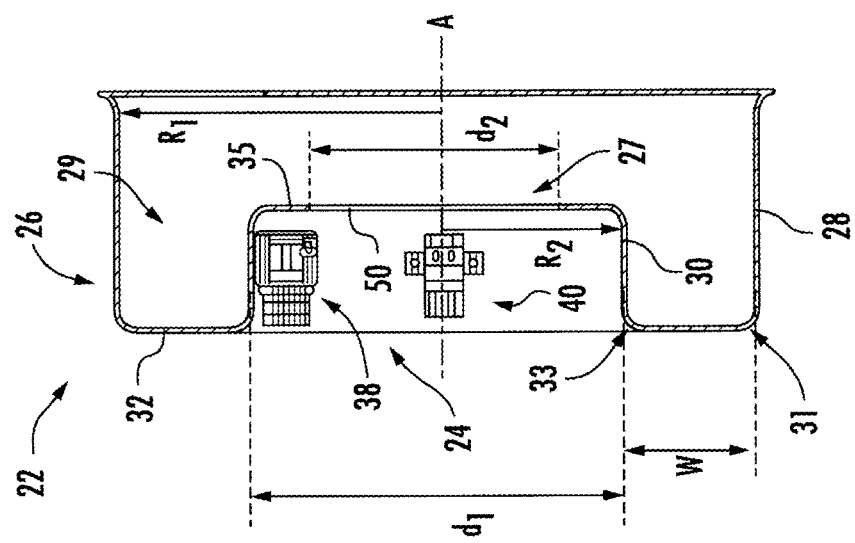
FIG. 4 shows an enlarged sectional view of the cover shown in FIGS. 2 and 3.
Figure 3:
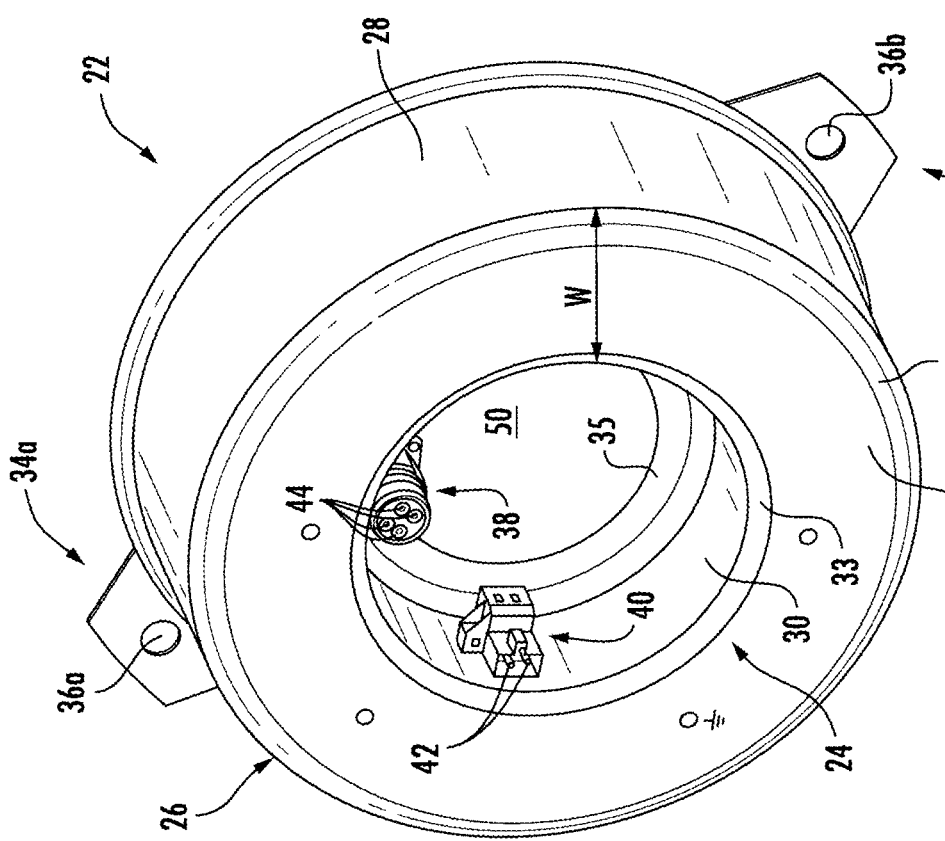
FIG. 3 shows a perspective view of the cover shown in FIG. 2.

A perspective view of the cover 22 is shown in FIG. 3. FIG. 4 depicts a sectional view of the cover 22.

The cover 22 has a cylindrical outer wall 28 extending circularly with an outer radius $R_1$ (see FIGS. 2 and 4) around the longitudinal axis A. The cover 22 further comprises a cylindrical inner wall 30 extending coaxially with respect to the outer wall 28 with an inner radius $R_2$ (see FIGS. 2 and 4) around the longitudinal axis A. Evidently, the inner radius $R_2$ is smaller than the outer radius $R_1$.

The ends of the inner and outer walls 30, 28 facing away from the housing 25 are connected with each other by a front face portion 32 extending in a plane oriented orthogonally to the longitudinal axis A and forming a front face of the cover 22.

In order to avoid sharp edges of the cover 20, which may be dangerous to mechanics working close to the elevator machine 9, slanted or curved wall portions 31, 33 are formed at the interfaces between the front face portion 32 and the inner and outer side walls 30, 28, respectively, The interior wall 30 defines a basically cylindrical open space 24 within the cover 22. The open space 24 is open at both end sides. I.e. the open space 24 constitutes a through hole extending through the cover 22 from the side facing the housing 25 (the right side in FIGS. 2 and 4) to the opposite side facing away from the housing 25 (the left side in FIGS. 2 and 4). The cover 22 may comprise a bottom ring 35 formed at the end of the inner side wall 30 facing the housing 25 so that the opening 27 of the open space 24 facing the housing 25 has a diameter $d_2$ which is smaller than the diameter $d_1$ of the open space 24 (cf. FIG. 4).

The opening 27 at the side of the open space 24 facing the housing 25 is closed completely by a bottom plate 50 extending over the diameter $d_1$ of the open space 24, whereas the opposing side of the open space 24 facing away from the housing 25 remains open.

The bottom plate 50 and the cover 22 may be made of different metals. For example, the bottom plate 50 may be made of zinc plated steel and the cover 22 may be made of galvanized steel, respectively.

The bottom plate 50 may be fixed to the cover 22 by means of suitable fastening elements, such as rivets or screws, which are not shown in the figures.

The outer wall 28, the inner wall 30 and the front face portion 32 in combination constitute a ring portion 26 circularly extending around the open space 24. The ring portion 26 has a shape similar to a doughnut with a radial width $W=R_1-R_2$.

When FIG. 4 is rotated by 90° in the clockwise direction around a virtual axis extending orthogonally to the plane of FIG. 4, it becomes apparent that the sectional contour of the cover 22 has the shape of a U with the bottom of said U facing the housing 25. Thus, the cover 22 may be considered as a solid of revolution obtained by rotating 360° a U shaped sectional contour around the longitudinal axis A.

Two mounting flaps 34a, 34b extend radially from the outer wall 28 (see FIG. 3, the mounting flaps 34a, 34b are not visible in FIG. 4). An opening 36a, 36b is formed in each of the mounting flaps 34a, 34b. This allows mounting the cover 22 to the housing 25 using fixing elements (not shown), such as bolts or screws, extending through the openings 36a, 36b into corresponding openings (not shown) formed within the housing 25.

Electric connectors 38, 40 respectively comprising one or more electric contacts 42, 44 are arranged within the open space 24. Exemplarily, two different types of electric connectors 38, 40 are depicted in the figures. The skilled person, however, will understand that more or fewer than two electric connectors 38, 40 may be arranged inside the open space 24. The electric connectors 38, 40 in particular may be mounted to the inner side wall 30 of the cover 22.

Being arranged within the open space 24, the electric connectors 38, 40 are protected from mechanical impact, in particular when the electric motor 20/elevator machine 9 is transported to and installed in an elevator system 2. The cover 22 also protects the electric connectors 38, 40 from mechanical impacts after the electric motor 20/elevator machine 9 has been installed, e.g. from mechanical impacts caused by a mechanic working at or close to the elevator machine 9.

The cover 22 further protects the electric connectors 38, 40 from liquids, in particular water and/or oil, that may flow along the outer periphery of the housing 25 and the cover 22 due to a leakage in the vicinity of the elevator machine 9, in particular in an area above the elevator machine 9.

Figure 5:
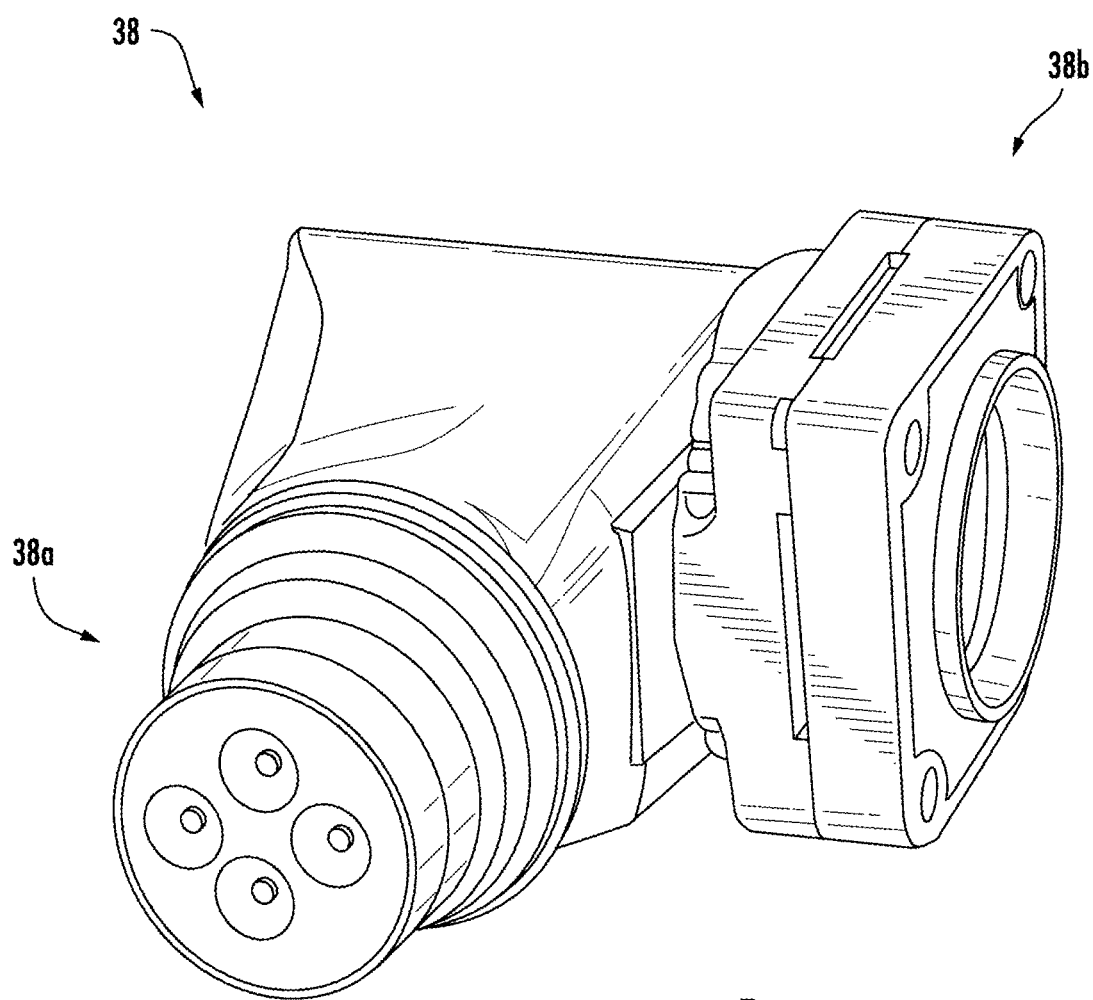
FIG. 5 shows a perspective view of a connector as it may be employed in a cover according to an exemplary embodiment of the invention.

An exemplary embodiment of an electric connector 38 is depicted in FIG. 5. The electric connector 38, 40 may be L-shaped, comprising a first leg 38a extending in an axial direction, i.e. parallel to the longitudinal axis A, and a second leg 38b extending orthogonally to the first leg 38a radially outwards from the longitudinal axis A (cf. FIGS. 2 to 4, the longitudinal axis A is not shown in FIG. 5).

The axial orientation of the first leg 38a allows for easily connecting the electric connector 38 with an external plug (not shown). The radial orientation of the second leg 38b allows conveniently connecting the electric connector 38 with electric components of the electric motor 20, such as the at least one electric coil 21. The connection in particular may be realized by employing electric conductors 41, such as electric cables or wires, extending through the space 29 formed between the inner and outer walls 28, 30 of the cover 22 (cf. FIG. 2). In such a configuration, not only the electric connectors 38, 40, but also the electric conductors 41 are protected by the cover 22.

For providing additional protection from liquids, a flange 46 may be provided on the front face portion 32 of the cover 22 facing away from the housing 25.

Figure 7:
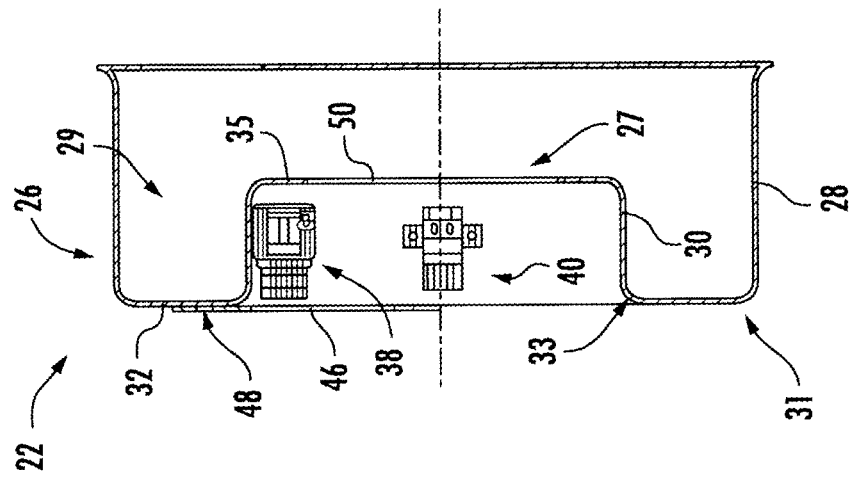
FIG. 7 shows a sectional view of the cover shown in FIG. 6.
Figure 6:
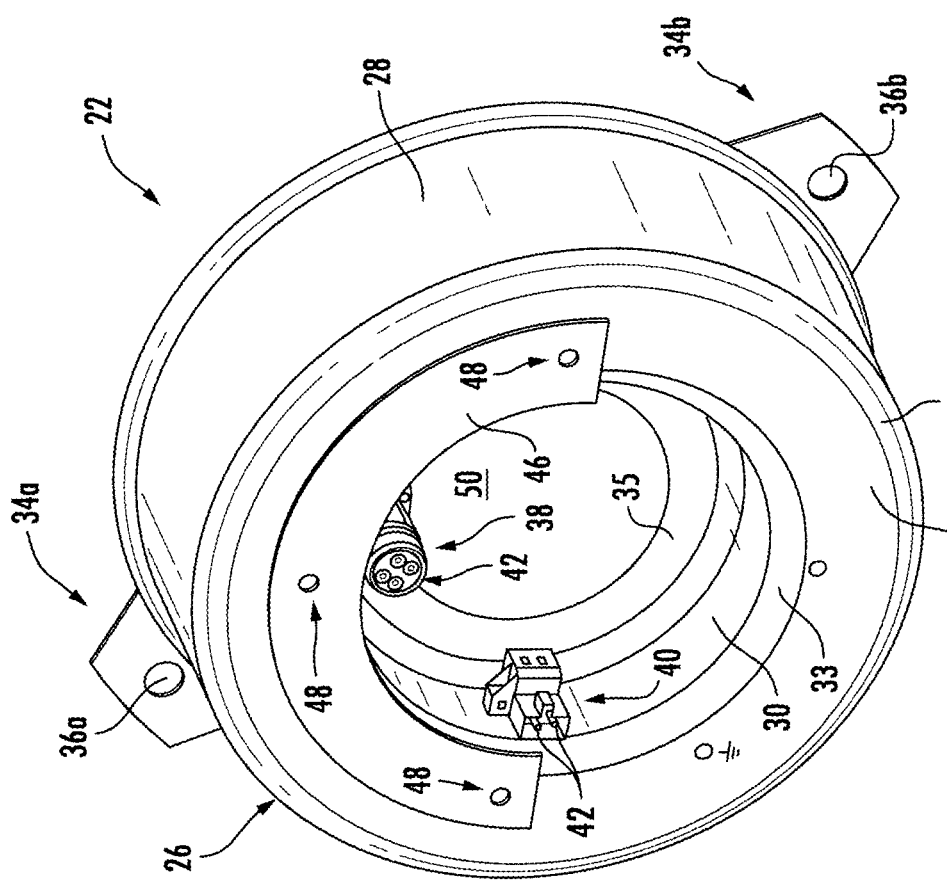
FIG. 6 shows a perspective view of a cover according to another exemplary embodiment.

FIG. 6 shows a perspective view of a cover 22 comprising such a flange 46, and FIG. 7 depicts a sectional view thereof.

The flange 46 may have a semicircular shape, which may be centered at the longitudinal axis A. The flange 46 in particular may be provided in the form of a semicircle extending along the upper half of the opening of the open space 24 when the electric motor 20 and the cover 22 are oriented in their final mounting positions. Such a flange 46 may deflect liquids flowing along the front face portion 32 of the cover 22. Thus, the flange 46 may help to prevent liquids such as water or oil flowing along the front face portion 32 of the cover 22 from flowing into the open space 24 and penetrating to the electric connectors 38, 40.

The flange 46 may be a semicircular plate attached to the front face portion 32 of the cover 22, as it is exemplarily shown in FIGS. 6 and 7. The flange 46 may be fixed to the front face portion 32 of the cover 22 by means of fasting elements such as bolts or screws (not shown) extending through mounting openings 48 formed in the flange 46 and in the cover 22, respectively. Alternatively or additionally, the flange 46 may be fixed to the front face portion 32 of the cover 22 using an adhesive.

As a further alternative, the flange 46 may be formed integrally with the cover 22.

While the invention has been described with reference to exemplary embodiments, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention is not limited to the particular embodiments disclosed, but that the invention includes all embodiments falling within the scope of the claims.

REFERENCES 2 elevator system
3 tension member
4 hoistway
5 drive
6 elevator car
7a landing control panel
7b car operation panel
9 elevator machine
8 landing
10 landing door
11 elevator car door
12 interior space
16 floor
17 roll/drum
18 elevator control
19 position sensor
20 electric motor
21 electric coil 22 cover
23 permanent magnet
24 open space
25 housing
26 ring portion
27 opening
28 outer wall
29 space within the cover
30 inner wall
31 slanted or curved wall portion
32 front face portion
33 slanted portion
34a, 34b mounting flaps
35 bottom ring
36a, 36b openings
38 electric connector
38a first leg
38b second leg
40 electric connector
42 electric contact
44 electric contact
46 flange
48 mounting opening
50 bottom plate
$d_1$ diameter of the open space
$d_2$ diameter of the opening of the open space facing the housing
$D_0$ diameter of the electric motor
$D_1$ diameter of the cover
$R_1$ radius of the outer wall
$R_2$ radius of the inner wall

What is claimed:

1. Electric motor for an elevator system, the electric motor comprising:
a housing extending in a longitudinal direction along a longitudinal axis (A) and
a cover attached to a front face of the housing, the cover comprising an open space formed around the longitudinal axis (A) and at least one electric connector electrically connectable to components of the electric motor and arranged within said open space;
wherein the cover has a U-shaped contour in a sectional plane extending basically orthogonally to the front face of the housing.

2. Electric motor according to claim 1, wherein the open space is a hollow space which is open to the environment on at least one side of the cover.

3. Electric motor according to claim 2, wherein the open space comprises an opening facing the electric motor and a bottom plate closing said opening.

4. Electric motor according to claim 1, wherein the cover includes a ring portion having a basically circular contour in a plane extending basically parallel to the front face of the housing.

5. Electric motor according to claim 1, wherein the cover includes at least one flap extending radially from an outer periphery of the cover.

6. Electric motor according to claim 1, wherein the open space has a basically circular contour in a plane extending basically parallel to the front face of the housing.

7. Electric motor according to claim 1, wherein the front face of the housing is oriented basically orthogonally to the longitudinal axis (A).

8. Electric motor according to claim 1, wherein the open space is a through hole extending through the whole width of the cover.

9. Electric motor according to claim 1, wherein the edges of the cover comprise slanted or curved wall portions.

10. Electric motor according to claim 1, wherein the edges of the open space comprise slanted or curved wall portions.

11. Electric motor according to claim 1, wherein the cover is made of a metallic material.

12. Electric motor for an elevator system, the electric motor comprising:
a housing extending in a longitudinal direction along a longitudinal axis (A) and
a cover attached to a front face of the housing, the cover comprising an open space formed around the longitudinal axis (A) and at least one electric connector electrically connectable to components of the electric motor and arranged within said open space;
wherein the at least one electric connector is L-shaped, in particular comprising a first leg extending parallel to the longitudinal axis (A) and a second leg extending in a direction oriented radially from the longitudinal axis (A).

13. Electric motor for an elevator system, the electric motor comprising:
a housing extending in a longitudinal direction along a longitudinal axis (A) and
a cover attached to a front face of the housing, the cover comprising an open space formed around the longitudinal axis (A) and at least one electric connector electrically connectable to components of the electric motor and arranged within said open space;
wherein the cover comprises at least one flange formed at the open space adjacent to the at least one electric connector and configured for protecting the at least one electric connector from liquid flowing along the cover.

14. Elevator system comprising:
an elevator car;
an elevator machine configured to impart motion to the elevator car, the elevator machine including an electric motor including:
a housing extending in a longitudinal direction along a longitudinal axis (A) and
a cover attached to a front face of the housing, the cover comprising an open space formed around the longitudinal axis (A) and at least one electric connector electrically connectable to components of the electric motor and arranged within said open space;
wherein the cover has a U-shaped contour in a sectional plane extending basically orthogonally to the front face of the housing.

* * * * *